US006332921B1

(12) United States Patent
Brothers et al.

(10) Patent No.: US 6,332,921 B1
(45) Date of Patent: *Dec. 25, 2001

(54) CEMENT COMPOSITIONS AND METHODS FOR HIGH TEMPERATURE WELLS CONTAINING CARBON DIOXIDE

(75) Inventors: Lance E. Brothers, Chickasha; Susan M. Turkett, Duncan, both of OK (US); Barry B. Ekstrand, Katy, TX (US); D. Chad Brenneis, Marlow; Jerry D. Childs, Duncan, both of OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/635,603

(22) Filed: Aug. 9, 2000

Related U.S. Application Data

(63) Continuation of application No. 09/133,004, filed on Jul. 27, 1998, now Pat. No. 6,143,069, which is a continuation-in-part of application No. 08/912,203, filed on Aug. 15, 1997, now Pat. No. 5,900,053.

(51) Int. Cl.[7] .......................... C04B 7/345; C04B 28/06; E21B 43/00
(52) U.S. Cl. .......................... 106/692; 106/696; 106/705; 106/708; 106/810; 106/819; 106/823; 106/DIG. 2; 166/293; 106/294
(58) Field of Search .................... 106/692, 696, 106/705, 708, 810, 819, 823, DIG. 1; 166/293, 294; 405/267

(56) References Cited

U.S. PATENT DOCUMENTS

| | | | |
|---|---|---|---|
| 2,250,107 | 7/1941 | Nelles | 106/97 |
| 3,180,748 | 4/1965 | Holmgren et al. | 106/104 |
| 3,782,985 | 1/1974 | Gebhardt | 106/97 |
| 3,901,316 | 8/1975 | Knapp | 166/250 |
| 4,256,503 | 3/1981 | Tsuda et al. | 106/100 |
| 4,310,486 | 1/1982 | Cornwell et al. | 264/209 |
| 4,397,354 | 8/1983 | Dawson et al. | 166/294 |
| 4,537,918 | 8/1985 | Parcevaux et al. | 523/130 |
| 4,596,834 | 6/1986 | Widener et al. | 521/83 |
| 4,916,012 | 4/1990 | Sawanobori et al. | 428/367 |
| 5,032,181 | 7/1991 | Chung | 106/717 |
| 5,120,367 | 6/1992 | Smith et al. | 106/823 |
| 5,147,565 | 9/1992 | Bour et al. | 252/8.551 |
| 5,185,389 | 2/1993 | Victor | 521/83 |
| 5,250,578 | 10/1993 | Cornwell | 521/83 |
| 5,258,222 | 11/1993 | Crivelli | 428/323 |
| 5,340,397 | 8/1994 | Brothers | 106/727 |
| 5,391,226 | 2/1995 | Frankowski | 106/696 |
| 5,453,310 | 9/1995 | Andersen et al. | 428/34.4 |
| 5,456,751 | 10/1995 | Zandi et al. | 106/724 |
| 5,588,489 | 12/1996 | Chatterji et al. | 166/293 |
| 5,624,489 | * 4/1997 | Fu et al. | 106/692 |
| 5,696,059 | 12/1997 | Onan et al. | 507/269 |
| 5,900,053 | 5/1999 | Brothers et al. | 106/678 |
| 6,143,069 | * 11/2000 | Brothers et al. | 106/678 |

OTHER PUBLICATIONS

Publication entitled "Rubber–Tire Particles As Concrete Aggregate" by Neil Eldin et al published in the Journal of Materials in Civil, Engineering, vol. 5, No. 4, pp. 479–496 Nov. 1993.

Publication entitled "The Properties of Rubberized Concretes" by I. Topcu published in the Cement Research Journal, vol. 25, No. 2. pp. 304–310 (1995), No month.

Publication entitled "Hot Alkali Carbonation of Sodium Metaphosphate Modified Fly Ash/Calcium Aluminate Blend Hydrothermal Cements" by T. Sugama published in the Cement and Concrete Research Journal, vol. 26, No. 11. pp. 1661–1672 Sep. 1996.

Publication entitled "Lightweight $CO_2$–Resistant Cements For Geothermal Well Completions", by Lawrence E. Kukacka, et al., publisher unknown and undated, but admitted to be prior art.

Publication entitled "Microsphere–Filled Lightweight Calcium Phosphare Cements" by Toshifumi Sugama, et al. under the auspices of the U.S. Department of Energy, Washington, D.C. under Contract No. DE–AC02–76CH00016; admitted to be prior art, Dec. 1992.

Publication entitled "Interfaces and Mechanical Behaviors of Fiber Reinforced Calcium Phosphate Cement Compositions", By T. Sugama, et al. prepared for the Geothermal Division U.S. Department of Energy; Department of Applied Science, Jun., 1992, but admitted to be prior art.

Publication entitled "Calcium Phosphate Cements Prepared by Acid–Base Reaction", by Toshifumi Sugama, et al. published in the Journal of the American Ceramic Society vol. 75, No. 8, pp. 2076–2087 Aug. 1992.

* cited by examiner

*Primary Examiner*—Michael Marcheschi
(74) *Attorney, Agent, or Firm*—Craig W. Roddy; C. Clark Dougherty, Jr.

(57) ABSTRACT

The present invention provides light weight high temperature well cement compositions and methods. The compositions are basically comprised of calcium aluminate, ASTM class F fly ash and water.

26 Claims, No Drawings

CEMENT COMPOSITIONS AND METHODS FOR HIGH TEMPERATURE WELLS CONTAINING CARBON DIOXIDE

CROSS-REFERENCES TO RELATED APPLICATIONS

This application is a Continuation of Ser. No. 09/123,004, filed Jul. 27, 1998, U.S. Pat. No. 6,143,069, which is a Continuation-In-Part of Ser. No. 08/912,203 filed Aug. 15, 1997, U.S. Pat. No. 5,900,053.

BACKGROUND OF THE INVENTION

1. Field of the Invention.

The present invention relates generally to light weight high temperature well cement compositions and methods, and more particularly, to such compositions and methods which are suitable for cementing high temperature wells containing carbon dioxide.

2. Description of the Prior Art.

In the completion of high temperature subterranean wells containing carbon dioxide, eg., geothermal wells, the use of conventional hydraulic cement compositions often results in early well failure. Because of the high static well bore temperatures involved coupled with the presence of brines containing carbon dioxide, conventional hydraulic well cements rapidly deteriorate due to alkali carbonation, especially sodium carbonate induced carbonation. In geothermal wells which typically involve very high temperatures, pressures and carbon dioxide concentrations, conventional well cement failures have occurred in less than five years causing the collapse of the well casing.

It has heretofore been discovered that a cement material known as calcium phosphate cement formed by an acid-base reaction between calcium aluminate and a phosphate-containing solution has high strength, low permeability and excellent carbon dioxide resistance when cured in hydrothermal environments. However, calcium phosphate cement has a relatively high density, eg., a density in the range of from about 15 to about 17 pounds per gallon, which is too high for geothermal applications. That is, in geothermal wells the hydrostatic pressure exerted by the high density calcium phosphate cement often exceeds the fracture gradients of subterranean zones penetrated by the well bore which causes the formation of fractures into which the cement is lost. While calcium phosphate cements have been developed which include hollow microspheres and as a result have densities of about 10 pounds per gallon, such light weight compositions are relatively expensive and the presence of the microspheres in the cured cement reduces its compressive strength.

Thus, there is a need for improved less expensive well cement compositions useful in cementing high temperature wells containing carbon dioxide.

SUMMARY OF THE INVENTION

The present invention provides improved cement compositions and methods which meet the needs described above and overcome the deficiencies of the prior art. The compositions are particularly useful in high temperature wells containing carbon dioxide such as geothermal wells. A composition of the present invention is basically comprised of calcium aluminate, fly ash and sufficient water to form a pumpable slurry.

Another composition of this invention is comprised of calcium aluminate, fly ash, sufficient water to form a pumpable slurry, a foaming agent, a foam stabilizer and a gas sufficient to form a foam having a density in the range of from about 9.5 to about 14 pounds per gallon.

Yet another composition of this invention is comprised of calcium aluminate, sodium polyphosphate, fly ash, sufficient water to form a pumpable slurry, a foaming agent, a foam stabilizer and a gas present in an amount sufficient to form a foam having a density in the range of from about 9.5 to about 14 pounds per gallon.

The methods of the present invention for cementing a high temperature subterranean zone containing carbon dioxide penetrated by a well bore basically comprise the steps of forming a well cement composition of this invention, pumping the cement composition into the subterranean zone by way of the well bore and allowing the cement composition to set into a hard impermeable mass therein.

It is, therefore, a general object of the present invention to provide light weight high temperature well cement compositions and methods.

A further object of the present invention is the provision of improved carbonation resistant well cement compositions and methods.

Other and further objects, features and advantages of the present invention will be readily apparent to those skilled in the art upon a reading of the description of preferred embodiments which follows.

DESCRIPTION OF PREFERRED EMBODIMENTS

As mentioned above, high temperature wells containing carbon dioxide such as geothermal wells generally require the use of well cement compositions which do not deteriorate in the presence of carbon dioxide containing brines. The term "high temperature" is used herein to mean wells wherein the static bottom hole temperature is above about 300° F. up to as high as about 700° F. When conventional hydraulic cements are utilized in such wells, carbonation causes dissolution of the cement which is converted into water-soluble salts. Further, severe corrosion of steel pipe takes place thereby resulting in the total disruption of the conventional cement supported well structure.

When conventional normal density cement slurries are utilized in geothermal and other similar wells, loss of circulation problems are often encountered. This is due to the weak unconsolidated formations in the wells having very low fracture gradients. When a relatively high density cement slurry is pumped into such a well, the hydrostatic pressure exerted on the weak unconsolidated subterranean zones therein causes the zones to fracture. This in turn causes the cement slurry being pumped to enter the fractures and lost circulation problems to occur. To avoid such problems, the cement compositions utilized in geothermal and other similar wells must be of light weight, i.e., have densities in the range of from about 9.5 to about 14 pounds per gallon.

By the present invention, improved well cement compositions are provided which resist high temperature carbonation deterioration. A cement composition of this invention which can be non-foamed or foamed is basically comprised of calcium aluminate, fly ash and sufficient water to form a pumpable slurry. When foamed, the cement composition includes a foaming agent, a foam stabilizer and a gas present in an amount sufficient to form a foam having a density in the range of from about 9.5 to about 14 pounds per gallon.

Another composition of this invention is comprised of calcium aluminate, sodium polyphosphate, fly ash, a foaming agent, a foam stabilizer and a gas present in an amount sufficient to form a foam having a density in the range of from about 9.5 to about 14 pounds per gallon.

The calcium aluminate can be any commercial grade calcium aluminate suitable for use as a cement. A suitable such calcium aluminate is commercially available from the Lehigh Portland Cement Company of Allentown, Pa., under the trade designation "REFCON™." The calcium aluminate is generally included in the cement composition in an amount in the range of from about 15% to about 45% by weight of the composition.

When used, the sodium polyphosphate includes sodium hexametaphosphate and sodium triphosphate as well as vitreous sodium phosphates. A suitable sodium polyphosphate for use in accordance with the present invention is commercially available from Calgon Corporation of Pittsburgh, Pa. The sodium polyphosphate can be included in the cement composition in an amount in the range of from about 5% to about 20% by weight of the composition. When included, the sodium polyphosphate combines with the calcium aluminate to form calcium phosphate in the form of hydroxyapatite.

Fly ash is the finally divided residue that results from the combustion of ground or powdered coal and is carried by the flue gases generated. A particular fly ash that is suitable in accordance with the present invention is a fine particle size ASTM class F fly ash having a Blaine fineness of about 10,585 square centimeters per gram which is commercially available from LaFarge Corporation of Michigan under the trade designation "POZMIX™." Another fly ash that is suitable is an ASTM class F fly ash which is commercially available from Halliburton Energy Services of Dallas, Texas under the trade designation "POZMIX™ A." The fly ash is generally included in the composition in an amount in the range from about 25% to about 45% by weight of the composition.

The major crystalline phase of ASTM class F fly ash is mullite ($3Al_2O_3.2SiO_2$). It reacts with calcium aluminate to form calcium alumino silicate ($CaO.Al_2O_3.2SiO_2$). Also, iron and quartz in the fly ash react with the calcium aluminate to form andradite ($Ca_3Fe_2SiO_4)_3$. These reactions increase the compressive strength of the set cement as compared to set calcium aluminate cement alone.

The water utilized can be from any source provided it does not contain an excess of compounds that adversely affect other compounds in the cement composition. For example, the water can be fresh water or saltwater. Generally, the water is present in the cement composition in an amount sufficient to form a pumpable slurry, i.e., an amount in the range of from about 10% to about 60% by weight of the composition.

In order to facilitate the foaming of the cement composition, a foaming agent is included in the composition. A particularly suitable and preferred such foaming agent is an alpha-olefinic sulfonate having the formula

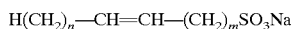

wherein n and m are individually integers in the range of from about 6 to about 16. The foaming agent is generally included in the cement composition in an amount in the range of from about 1% to about 2% by weight of the water in the composition. The most preferred foaming agent of this type is an alpha-olefinic sulfonate having the above formula wherein n and m are each 16, i.e., a sulfonic acid $C_{16-16}$ alkane sodium salt.

A foam stabilizer is also included in the cement composition to enhance the stability of the composition after it is foamed. A particularly suitable and preferred stabilizing agent is an amidopropylbetaine having the formula

wherein R is a radical selected from the group of decyl, cetyl, oleyl, lauryl and cocoyl. The foam stabilizer is generally included in the cement composition in an amount in the range of from about 0.5% to about 1% by weight of the water in the composition. The most preferred foam stabilizer of this type is cocoylamidopropylbetaine.

The gas utilized to foam the composition can be air or nitrogen, with nitrogen being the most preferred. The amount of gas present in the cement composition is that amount which is sufficient to form a foam having a density in the range of from about 9.5 to 14 pounds per gallon, most preferably 12 pounds per gallon.

In order to provide resiliency to the set cement composition of this invention, the composition may optionally include inert ground rubber particles. Such particles are produced from worn out tires and are commercially available from Four D Corporation of Duncan, Okla.

At static well bore temperatures above about 125° F., a set retarder is required. The set retarder functions to lengthen the time in which the cement composition starts to thicken and set so that the composition can be pumped into the well bore and into the zone to be cemented before such thickening takes place. Preferred such set retarders for use in accordance with this invention are gluconic acid and citric acid. When used, the set retarder is included in the cement composition in an amount in the range of from about 0.5% to about 2% by weight of the composition.

A preferred composition of the present invention is comprised of calcium aluminate present in an amount of about 30% by weight of the composition, ASTM class F fly ash present in an amount of about 50% by weight of the composition and water present in an amount sufficient to form a slurry.

Another preferred composition of the present invention is comprised of calcium aluminate present in an amount of about 30% by weight of the composition, ASTM class F Fly Ash present in an amount of about 50% by weight of the composition, sufficient water to form a pumpable slurry, a foaming agent comprised of a sulfonic acid $C_{16-16}$ alkane sodium salt present in an amount of about 1.5% by weight of the water in the composition, a foam stabilizer comprising cocoylamidopropyl- betaine present in an amount of about 0.75% by weight of the water in the composition and a gas present in an amount sufficient to form a foam having a density in the range of from about 9.5 to about 14 pounds per gallon.

Yet another preferred composition of this invention is comprised of calcium aluminate present in an amount of about 28% by weight of the composition, sodium polyphosphate present in an amount of about 19% by weight of the composition, ASTM class F fly ash present in an amount of about 49% by weight of the composition, sufficient water to form a pumpable slurry, a foaming agent comprised of a sulfonic acid $C_{16-16}$ alkane sodium salt present in an amount of about 8% by weight of the water in the composition, a foam stabilizer comprising cocylamideopropylbetaine present in an amount of about 4% by weight of the water in the composition and a gas present in an amount sufficient to form a foam having a density in the range of from about 9.5 to about 14 pounds per gallon.

As previously mentioned, the above described cement compositions can include ground rubber particles present in an amount in the range of from about 10% to about 40% by weight of the compositions to improve the resiliency of the compositions. Further, when the static well bore temperature is above about 125° F., a set retarder selected from the group of gluconic acid and citric acid is included in the cement compositions in an amount of about 1.0% by weight of the compositions.

The cement compositions of this invention may be prepared in accordance with any of the mixing techniques utilized in the art. In one preferred method, a quantity of water is introduced into a cement blender followed by the sodium polyphosphate (if used), calcium aluminate and fly ash. The mixture is agitated for a sufficient period of time to form a pumpable non-foamed slurry.

When the cement slurry formed as above is foamed, the slurry is pumped to the well bore and the foaming agent and foam stabilizer followed by the gas utilized are injected into the slurry on the fly. As the slurry and gas flow through the well bore to the location where the resulting foamed cement composition is to be placed, the cement composition is foamed and stabilized. Other liquid additives utilized, if any, are added to the water prior to when the other components of the cement composition are mixed therewith and other dry solids, if any, are added to the water and cement prior to mixing.

The methods of this invention of cementing a high temperature subterranean zone containing carbon dioxide penetrated by a well bore are basically comprised of the steps of forming a foamed cement composition of this invention, pumping the foamed cement composition into the subterranean zone to be cemented by way of the well bore and then allowing the foamed cement composition to set into a hard impermeable mass therein.

In order to further illustrate the improved cement compositions and methods of this invention, the following examples are given.

EXAMPLE 1

In a controlled test, API Class G Portland Cement was mixed with 40% silica flour and water to form a cement slurry. The slurry was allowed to set for 24 hours at a temperature of 190° F. Thereafter, the set cement was placed in an aqueous 4% by weight sodium carbonate solution for 28 days at 600° F.

A calcium phosphate cement composition was prepared comprised of 23.3% water; 17.5% calcium aluminate; 15.6% sodium polyphosphate; 40.8% ASTM class F fly ash, 1.9% sulfonic acid $C_{16-16}$ alkane sodium salt foaming agent and 0.9% cocoylamidopropylbetaine foam stabilizer, all by weight of the composition. After mixing, the resulting slurry was allowed to set for 24 hours at a temperature of 190° F. Thereafter, the set cement was placed in a 4% by weight aqueous sodium carbonate solution for 28 days at 600° F.

At the end of the test periods, samples from the interiors of the set Portland Cement composition and calcium aluminate cement composition were tested. The tests showed that the Portland Cement composition contained 1.5% by weight calcium carbonate and the calcium phosphate cement contained none. Samples were also tested taken from the exteriors of the set cements which showed that the Portland cement composition contained 10.6% calcium carbonate while the calcium phosphate cement contained none.

EXAMPLE 2

Test calcium phosphate cement slurry samples were prepared by mixing 240 grams of water with 180 grams of calcium aluminate, 160 grams of sodium polyphosphate and 420 grams of fly ash for each sample. Various Portland cement set retarding additives were combined with the test samples. After mixing, each test sample was tested for thickening time at 125° F. in accordance with the test procedure set forth in *API Specification For Materials And Testing For Well Cements,* API Specification 10, 5th ed., dated Jul. 1, 1990 of the American Petroleum Institute. The set retarders tested are identified and the thickening time test results are set forth in Table 1 below.

TABLE I

| | Thickening Time Tests[1] | |
| --- | --- | --- |
| Set Retarder Tested | Amount Added to Test Sample, grams | Thickening Time, hrs.:mins. |
| None | — | 1:35 |
| Acrylic Acid Polymer | 6 | 2:02 |
| Tararic Acid | 6 | 1:12 |
| Gluconic Acid | 6 | 4:05 |
| Citric Acid | 6 | 6:00+ |

[1]API Tests at 125° F.

From Table I, it can be seen that gluconic acid and citric acid are the most effective set retarders for the calcium aluminate cement composition at a temperature of 125° F.

EXAMPLE 3

Two additional calcium aluminate cement slurry samples were prepared as shown in Table II below. After mixing, the resulting slurries were allowed to set for 24 hours at 190° F. Thereafter, the set samples were placed in 4% by weight aqueous sodium carbonate solutions for 28 days at 600° F. At the end of the 28 day periods, the samples were tested for compressive strengths in accordance with the above mentioned *API Specification* 10. The results of the tests are also set forth in Table II below.

TABLE II

| | Compressive Strength Tests | | | | | | | |
| --- | --- | --- | --- | --- | --- | --- | --- | --- |
| | Sample Components, grams | | | | | | | Compressive |
| Sample No. | Water | Calcium Aluminate[1] | Sodium Phosphate[2] | Fly Ash[3] | Foaming Agent[4] | Foam Stabilizer[5] | Density lb./gal. | Strength, psi |
| 1 | 465.5 | 350 | 311.5 | 815.5 | 37.3 | 18.6 | 12.1 | 570 |
| 2 | 266 | 200 | 178 | 466 | 21.3 | 10.6 | 15.1 | 1060 |

[1]"REFCON ™" from Lehigh Portland Cement Co.
[2]Calgon Sodium Polyphosphate

TABLE II-continued

Compressive Strength Tests

| Sample No. | Water | Calcium Aluminate[1] | Sodium Phosphate[2] | Fly Ash[3] | Foaming Agent[4] | Foam Stabilizer[5] | Density lb./gal. | Compressive Strength, psi |
|---|---|---|---|---|---|---|---|---|

[3]ASTM class F fly ash from LaFarge Corp.
[4]Sulfonic acid $C_{16-16}$ alkane sodium salt
[5]Cocoylamidopropylbetaine From Table II, it can be seen that the calcium aluminate cement compositions of the present invention maintained their compressive strengths after 28 days in the presence of sodium carbonate solutions at 600° F.

EXAMPLE 4

An API Class G Portland cement was mixed with 40% silica flour and water to form a cement slurry. The slurry was allowed to set for 48 hours at a temperature of 500° F. Thereafter, the set cement was placed in an aqueous solution containing 2.4% dry ice and 0.8% sulfuric acid. A calcium aluminate cement composition was prepared comprised of 30% water, 37% calcium aluminate and 33% ASTM class F fly ash. The resulting slurry was allowed to set for 48 hours at a temperature of 500° F. Thereafter, the set cement was placed in an aqueous solution containing 2.4% dry ice and 0.8% sulfuric acid. The above described test cement samples were kept in the carbonate-acid solutions for 53 days at 500° F., after which the Portland cement lost 33% of its weight while the calcium aluminate cement gained 9.1% in weight.

Calcium aluminate (Lehigh "REFCON™") was mixed with 59% by weight water and cured for 24 hours at 500° F. The same calcium aluminate was mixed with ASTM class F fly ash in an amount of 75% by weight of the calcium aluminate and with water in an amount of 34% by weight of calcium aluminate and cured for 24 hours at 500° F. The set samples were tested for compressive strengths in accordance with the above mentioned *API Specification* 10. The set sample formed with calcium aluminate alone had a compressive strength of only 410 psi while the sample formed with calcium aluminate and fly ash had a compressive strength of 2120 psi.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved cement composition useful for cementing high temperature wells containing carbon dioxide comprising:

calcium aluminate present in an amount of about 15% to about 45% by weight of said composition;

fly ash present in an amount of about 25% to about 45% by weight of said composition;

sodium polyphosphate present in an amount in the range of from about 5% to about 13% by weight of the composition;

a set retarder for lengthening the time in which said composition starts to thicken and set whereby said composition is capable of being pumped into wells having bottom hole temperatures above about 125° F., said set retarder being present in an amount in the range of from about 0.5% to about 2% by weight of said composition; and sufficient water to form a pumpable slurry.

2. The composition of claim 1 wherein said fly ash is ASTM class F fly ash.

3. The composition of claim 2 wherein said ASTM class F fly ash has a Blaine fineness of about 10,585 square centimeters per gram.

4. The composition of claim 1 wherein said water is selected from the group consisting of fresh water and saltwater.

5. The composition of claim 1 wherein said water is present in said composition in an amount in the range of from about 10% to about 60% by weight of said composition.

6. The composition of claim 1 wherein said set retarder is selected from the group consisting of citric acid and gluconic acid.

7. An improved cement composition useful for cementing high temperature wells containing carbon dioxide comprising:

calcium aluminate present in an amount of about 15% to about 45% by weight of said composition;

fly ash present in an amount of about 25% to about 45% by weight of said composition;

sodium polyphosphate present in an amount of about 5% to about 20% by weight of the composition;

a set retarder for lengthening the time in which said composition starts to thicken and set whereby said composition is capable of being pumped into wells having bottom hole temperatures above about 125° F., said set retarder being present in an amount in the range of from about 0.5% to about 2% by weight of said composition; and sufficient water to form a pumpable slurry.

8. The composition of claim 7 wherein said fly ash is ASTM class F fly ash.

9. The composition of claim 8 wherein said ASTM class F fly ash has a Blaine fineness of about 10,585 square centimeters per gram.

10. The composition of claim 7 wherein said water is selected from the group consisting of fresh water and saltwater.

11. The composition of claim 7 wherein said water is present in said composition in an amount in the range of from about 10% to about 60% by weight of said composition.

12. The composition of claim 7 wherein said set retarder is selected from the group consisting of citric acid, gluconic acid and tartaric acid.

13. A method of cementing a subterranean zone comprising the steps of:

forming a well cement composition comprising:

calcium aluminate present in an amount of about 15% to about 45% by weight of said composition, fly ash present in an amount of about 25% to about 45% by weight of said composition, sodium polyphosphate present in an amount in the range of from about 5% to about 20% by weight of the composition, and sufficient water to form a pumpable slurry;

pumping said cement composition into said subterranean zone; and allowing said cement composition to set into a hard impermeable mass therein.

14. The method of claim 13 wherein said fly ash is ASTM class F fly ash.

15. The method of claim 14 wherein said ASTM class F fly ash has a Blaine fineness of about 10,585 square centimeters per gram.

16. The method of claim 13 wherein said water is selected from the group consisting of fresh water and saltwater.

17. The method of claim 13 wherein said water is present in said composition in an amount in the range of from about 10% to about 60% by weight of said composition.

18. The method of claim 13 wherein said composition further comprises an effective amount of a set retarder for lengthening the amount of time it takes from composition to thicken and set.

19. The method of claim 18 wherein said set retarder is selected from the group consisting of citric acid, gluconic acid and tartaric acid.

20. The method of claim 19 wherein said set retarder is present in an amount in the range of from about 0.5% to about 2% by weight of said composition.

21. The method of claim 13 wherein said subterranean zone is a high temperature subterranean zone containing carbon dioxide.

22. A method of cementing a subterranean zone comprising the steps of:

forming a well cement composition comprising:

calcium aluminate present in an amount of about 15% to about 45% by weight of said composition, ASTM class F fly ash present in an amount of about 25% to about 45% by weight of said composition, sodium polyphosphate present in an amount of about 5% to about 20% by weight of the composition, a set retarder selected from the group consisting of citric acid, gluconic acid and tartaric acid present in an amount of about 0.5% to about 2% by weight of said composition, and sufficient water to form a pumpable slurry;

pumping said cement composition into said subterranean zone; and allowing said cement composition to set into a hard impermeable mass therein.

23. The method of claim 22 wherein said sodium polyphosphate is present in an amount up to about 13% by weight of said composition.

24. The method of claim 22 wherein said water is selected from the group consisting of fresh water and saltwater.

25. The method of claim 22 wherein said water is present in said composition in an amount in the range of from about 10% to about 60% by weight of said composition.

26. The method of claim 22 wherein said subterranean zone is a high temperature subterranean zone containing carbon dioxide.

* * * * *